Patented Oct. 2, 1923.

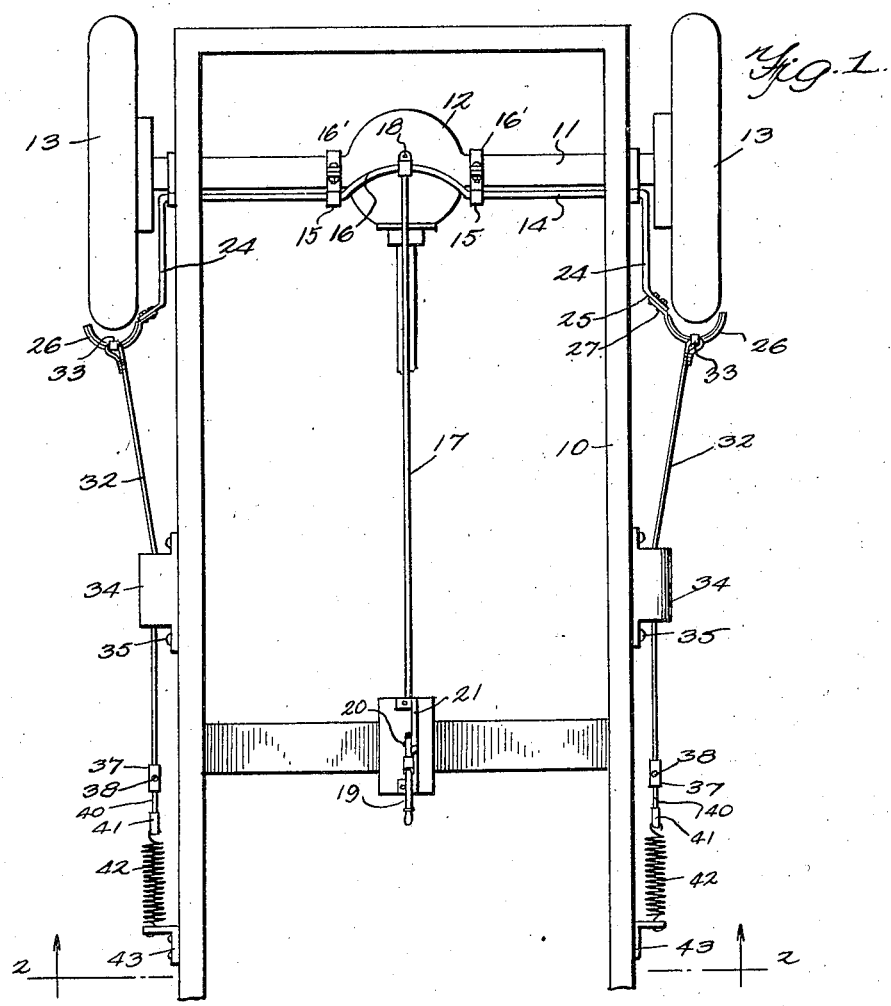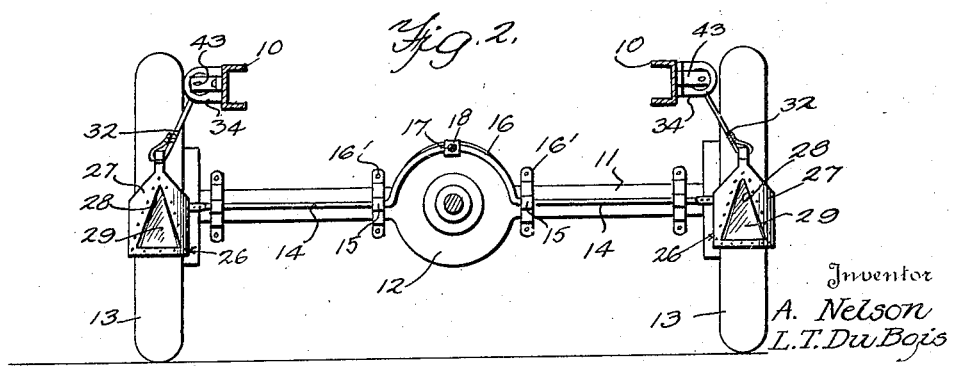

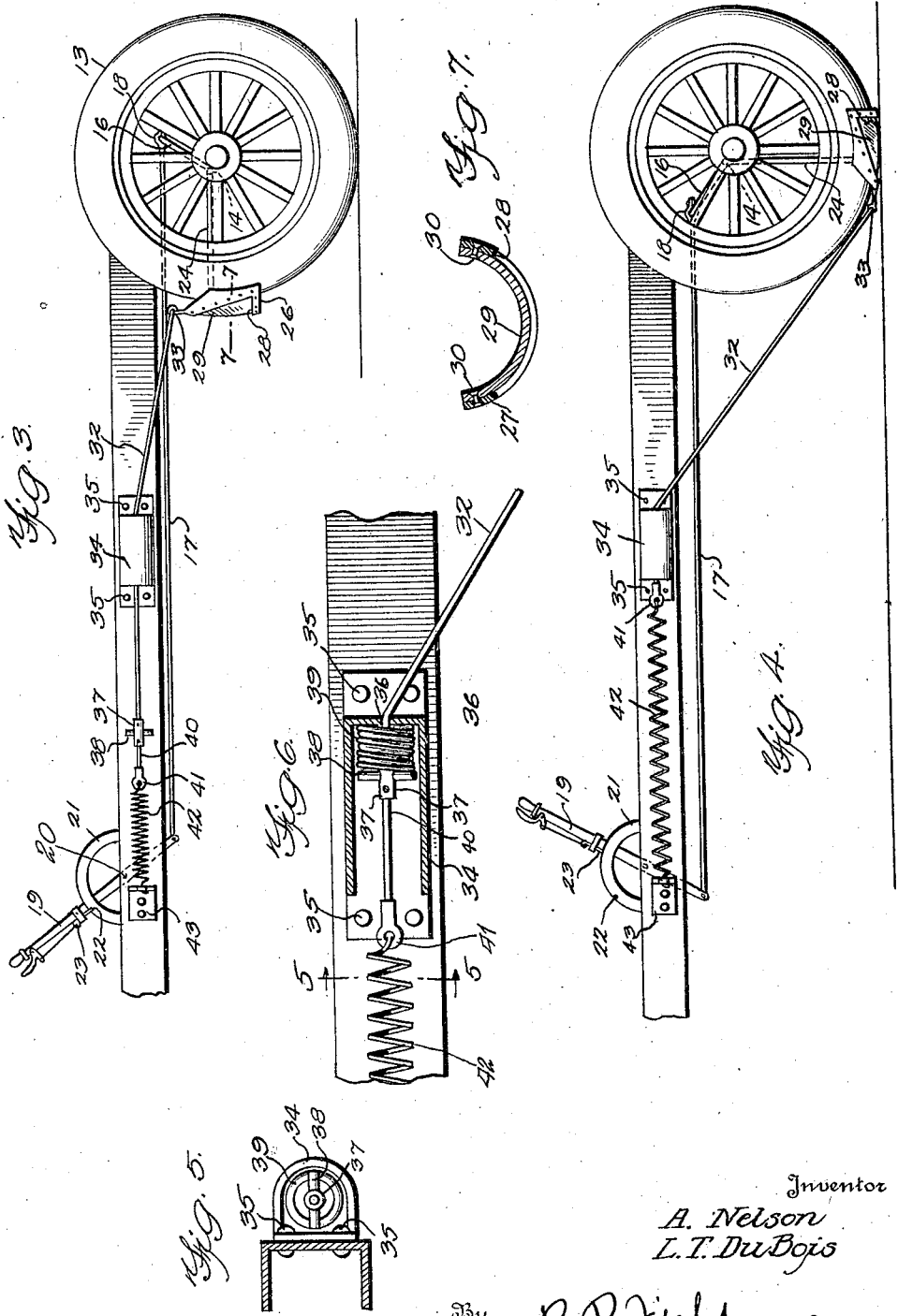

1,469,428

UNITED STATES PATENT OFFICE.

ALVIN NELSON AND LOUIS T. DU BOIS, OF VALLEJO, CALIFORNIA.

EMERGENCY BRAKE.

Application filed February 1, 1922. Serial No. 533,147.

*To all whom it may concern:*

Be it known that we, ALVIN NELSON and LOUIS T. DU BOIS, citizens of the United States, residing at Vallejo, in the county of Solano and State of California, have invented certain new and useful Improvements in Emergency Brakes, of which the following is a specification.

The present invention relates to brake apparatus for use in connection with an automobile, and is intended principally to be employed in cases of emergency, and has particular reference to improvements in this type of apparatus wherein a shoe is lowered into contact with the road bed, and is in turn engaged by the wheel of the vehicle.

An important object of the invention is to provide a device of the above mentioned character, which is of simple construction, and having yielding means to take up the shocks when the shoe is lowered, such means also serving to positively limit the rearward movement of the shoe.

A further object of the invention is to provide a device of the above mentioned character which may be applied to the ordinary automobile without materially altering the construction thereof.

Other objects and advantages of the invention will be apparent during the course of the following description.

In the accompanying drawings forming a part of this specification, and in which like numerals are employed to designate like parts throughout the same, Fig. 1 is a plan view of apparatus embodying my invention, showing the same applied to an automobile, Fig. 2 is a transverse section taken on line 2—2 of Figure 1, Fig. 3 is a side elevation of the apparatus, with the shoe elevated, Fig. 4 is a similar view with the shoe raised, Fig. 5 is a detail section taken on line 5—5 of Figure 6, Fig. 6 is a longitudinal section through the spring casing, and, Fig. 7 is a detail section through the shoe taken on line 7—7 of Figure 3.

In the drawings, wherein for the purpose of illustration is shown a preferred embodiment of our invention, the numeral 10 designates the frame or chassis of an automobile having a rear axle casing 11 and a differential casing 12. The axle casing 11 carries the usual rear wheels 13 of the vehicle.

My brake apparatus embodies a horizontal transverse rock shaft 14, which may be tubular if desired. This rock shaft is journaled in bearings 15, carried by brackets 16' suitably clamped to the axle casing 11. The rock shaft 14 has a central crank portion 16, employed to turn the rock shaft. A connecting rod or link 17 is pivotally connected with the crank portion 16, at 18, and this crank portion is bent to fit about the differential casing 12. The rod 17 extends forwardly and is pivotally connected with the lower end of a vertically swinging lever 19, pivoted at 20. This lever operates adjacent to a quadrant 21, having one forward notch 22, but the remainder of the quadrant is preferably smooth. The lever is equipped with latch means 23, to engage in the notch 22 of the quadrant.

The rock shaft 14 is provided at its ends with cranks or radially extending arms 24, the outer ends of which are bent outwardly and laterally, at 25. The arms 24 have shoes 26 rigidly secured thereto, at 27. Each shoe 26 is preferably formed of suitably thick sheet metal, transversely curved and also longitudinally curved, to conform generally to the shape of the tire. The shoe 26 has a central opening 28, and each shoe is entirely lined interiorly with a strip of fibrous material 29, Figs. 2 and 7, secured to the shoe at 30. This strip of fibrous material may be felt suitably reinforced and strengthened, or any other suitable fibrous material. When the shoe is lowered to the contact position, Fig. 4, the tire engages with this fibrous material, which in turn engages with the road bed, preventing slipping. The numeral 32 designates cables or other flexible elements, connected with the forward ends of the shoes 26, at 33, and these cables extend forwardly in inclined positions and enter casings 34, bolted to the sides of the frame 10, at 35. The rear end of each casing 34 has a central opening 36, through which the cable 32 passes. This cable is connected with a coupling 37, carrying a transverse pin or element 38. A compressible coil spring 39 is confined between the rear closed end of the casing 34 and the transverse pin 38, and surrounds the cable 32. The coupling 37 is secured to a rod 40, to the other end of which is attached an eye 41. The forward end of the casing 34 is entirely open, and the eye 41 has a retractile coil spring 42 connected therewith. This spring 42 has its forward end connected with a bracket 43, secured to the side of the frame.

In the use of the apparatus, under ordinary conditions, the lever 19 is moved to the forward position, and is locked in this position by the latch means engaging in the notch 22. The shoes 26 are now elevated, as shown in Figure 3. The springs 39 and 42 also tend to elevate the shoes and serve to retain the parts taut, and prevent rattling. When it is desired to suddenly stop the automobile, the lever 19 is shifted rearwardly, and this turns the rock shaft 14 forwardly, throwing the shoes 26 to the lowered position. When the shoes approach the lowered position they are engaged by the wheels and there is a tendency for the wheels to suddenly jerk the shoes rearwardly. The strain caused by this action is taken by the compressible coil springs 39 aided by the retractile coil springs. The compressible coil springs 39 upon becoming compressed or closed, coact with the cables 32 to positively lock the shoes against rearward movement beyond the position shown in Figure 4 beneath the center of the tire. The section of fibrous material 29 by contacting with the tire and with the road bed, serves to effectively prevent slipping. When the car is brought to a rest, it may be backed slightly and the wheels will release the shoes, which will be automatically shifted upwardly and the lever 19 returned to the forward position, the lever being then locked in this forward position. It is thus seen that the springs, particularly the retractile coil springs, serve as means to automatically restore the several parts to the active position.

It is to be understood that the form of our invention herewith shown and described, is to be taken as a preferred example of the same, and that various changes in the shape, size and arrangement of parts may be resorted to without departing from the spirit of our invention or the scope of the subjoined claims.

Having thus described our invention, we claim:

1. The combination with the frame and wheels of an automobile, of a support pivotally connected with the frame, shoes carried by their pivoted support and adapted to move beneath the wheels, casings secured to the frame, compressible coil springs held within the casings, cables connected with the shoes and extending forwardly and upwardly into said casing and through said coil springs, stop elements connected with the cables and engaging the coil springs, said coil springs serving to retard the rearward movement of the shoes and also to positively hold them against rearward movement beyond a desired point, manually operated means to swing the pivoted support downwardly, and automatic means attached to said cables and operating in conjunction with the compressible coil springs to shift the pivoted support upwardly.

2. The combination with a transverse rock shaft pivotally connected with the frame of an automobile near the rear wheels thereof, of outwardly extending arms carried by the rock shaft, shoes carried by the outwardly extending arms and adapted to be shifted beneath the rear wheels, manually operated means to turn the rock shaft to lower the shoes, casings carried by the frame of the automobile in advance of said shoes, compressible coil springs within the casings, cables connected with the forward ends of the shoes and extending into the casing and coil springs, a stop element secured to each cable and engaging the coil spring, said coil spring being adapted to be closed by the stop element and positively limit the rearward movement of the shoe, and a retractile coil spring also connected with the cable and serving to return the shoe to the elevated position.

3. The combination with a rock shaft secured to the rear portion of an automobile near the rear wheels thereof and having a crank portion, a manually operated lever, a link connecting the crank portion and lever, means to lock the lever in the forward position only, outwardly extending arms carried by the rock shaft, shoes carried by the arms and adapted to be shifted beneath said wheels, casings secured to the automobile in advance of the shoes, compressible coil springs within the casing, cables connected with the shoes and extending forwardly in an inclined position to enter the casings, couplings secured to the cables and embodying stop elements engaging the compressible coil springs, said coil springs when completely compressed serving to positively limit the rearward movement of said shoes, and retractile coil springs connected with the coupling forwardly of the compressible springs and serving to complete the upward movement of the shoes and to shift the lever to its forward position so that it may be locked in such position.

4. The combination with a vertically movable support arranged near the wheel of an automobile, of a shoe carried thereby and adapted to be moved beneath the wheel, a flexible element connected with the shoe, yielding means to retard the rearward movement of the flexible element and positively hold it against rearward movement beyond a predetermined point, and separate yielding means connected with the flexible element to complete its forward movement and raise the shoe to the uppermost position.

In testimony whereof we affix our signatures.

ALVIN NELSON.
LOUIS T. DU BOIS.